March 10, 1936.   H. H. STORCH ET AL   2,033,159
METHOD OF RECOVERING POTASSIUM SULPHATE FROM SYNGENITE
Filed Aug. 30, 1933   3 Sheets-Sheet 3

*Illustrative Flow Sheet for Recovery of Potassium Sulphate from Syngenite*

Inventors
Henry H. Storch and Nathan Fragen
By William H. Rounds
Attorney

Patented Mar. 10, 1936

2,033,159

UNITED STATES PATENT OFFICE 2,033,159

METHOD OF RECOVERING POTASSIUM SULPHATE FROM SYNGENITE

Henry H. Storch, Pittsburgh, Pa., and Nathan Fragen, Ann Arbor, Mich., assignors to the United States of America, as represented by the Secretary of Commerce Application August 30, 1933, Serial No. 687,479

9 Claims. (Cl. 23—121)

(Granted under the act of March 3, 1883, as amended April 30, 1928; 370 O. G. 757)

This invention described herein may be manufactured and used by or for the Government for governmental purposes, without the payment to us of any royalty thereon.

This invention relates to a method of recovering potassium sulphate from syngenite.

The object of this invention is to produce potassium sulphate from the mineral or salt syngenite ($K_2SO_4 \cdot CaSO_4 \cdot H_2O$). A further object is to recover a residue of calcium sulphate.

Syngenite occurs in various natural deposits of potassium salts. It may furthermore be obtained readily by treatment of the mineral polyhalite ($K_2SO_4 \cdot MgSO_4 \cdot 2CaSO_4 \cdot 2H_2O$). While syngenite itself is a potassium salt suitable for use in the manufacture of fertilizers, it may be desirable to separate the calcium sulphate combined in this double salt in order to produce potassium sulphate, a more valuable material.

A clearer and more concise understanding will be had from the description which follows, by referring to the accompanying charts in which—

We have deduced from laboratory equilibrium data in the prior literature that syngenite may be decomposed by hot water to yield a solution of potassium sulphate and a solid residue of potassium pentacalcium sulphate $$(K_2SO_4 \cdot 5CaSO_4 \cdot H_2O),$$

hereinafter designated pentasalt, and that the pentasalt produced by the decomposition of syngenite with hot water may in turn be decomposed by water at ordinary temperatures to yield a dilute solution of potassium sulphate and a solid residue of calcium sulphate in the form of gypsum ($CaSO_4 \cdot 2H_2O$). These prior equilibrium data do not, however, supply an adequate basis for an industrial process because they give no information as to whether the rates of decomposition would be sufficiently rapid for practical use. Furthermore, these data lead to conclusions concerning the optimum temperature for the decomposition of syngenite which we have found to be incorrect.

We have investigated the extraction of potassium sulphate from syngenite and from a mixture of syngenite and gypsum calcined to render the calcium sulphate inactive during extraction, using water at temperatures of from 80° to 100° C. We have also investigated the extraction of potassium sulphate from pentasalt by water at ordinary temperatures approximating 25° C.

We have found that syngenite prepared from polyhalite may be decomposed more advantageously at the atmospheric boiling point than at any lower temperature. An extract liquor containing from 9.0 to 9.5 parts of $K_2SO_4$ per 100 parts of water combined with an extraction of approximately 75 per cent of the potassium sulphate from the syngenite may be obtained by moderate agitation with water for 4 hours. By increasing the time of contact to 6 hours, the concentration of the extract liquor may be increased to between 9.5 and 10 parts of $K_2SO_4$ per 100 parts of water.

We have furthermore found that it is not possible to treat directly in this manner a mixture of syngenite and gypsum obtained from polyhalite, due to the rapid reaction of the gypsum with the extract liquors to form pentasalt, thereby reducing both the $K_2SO_4$ concentration and recovery in these liquors. We have discovered, however, that natural anhydrite ($CaSO_4$) does not react at an appreciable rate to form pentasalt when placed in contact with a liquor at 100° C. containing as much as 10 parts of $K_2SO_4$ per 100 parts of water. Acting on this discovery, we have found that by calcining a mixture of syngenite and gypsum at a temperature of 500±40° C. the gypsum is converted into a form of calcium sulphate which does not react at an appreciable rate with liquors of the $K_2SO_4$ concentration obtained during the extraction of syngenite. Extraction of such calcined syngenite-gypsum mixtures with water at the atmospheric boiling point yields $K_2SO_4$ concentrations and recoveries practically the same as those obtained with pure syngenite.

Figure 1:
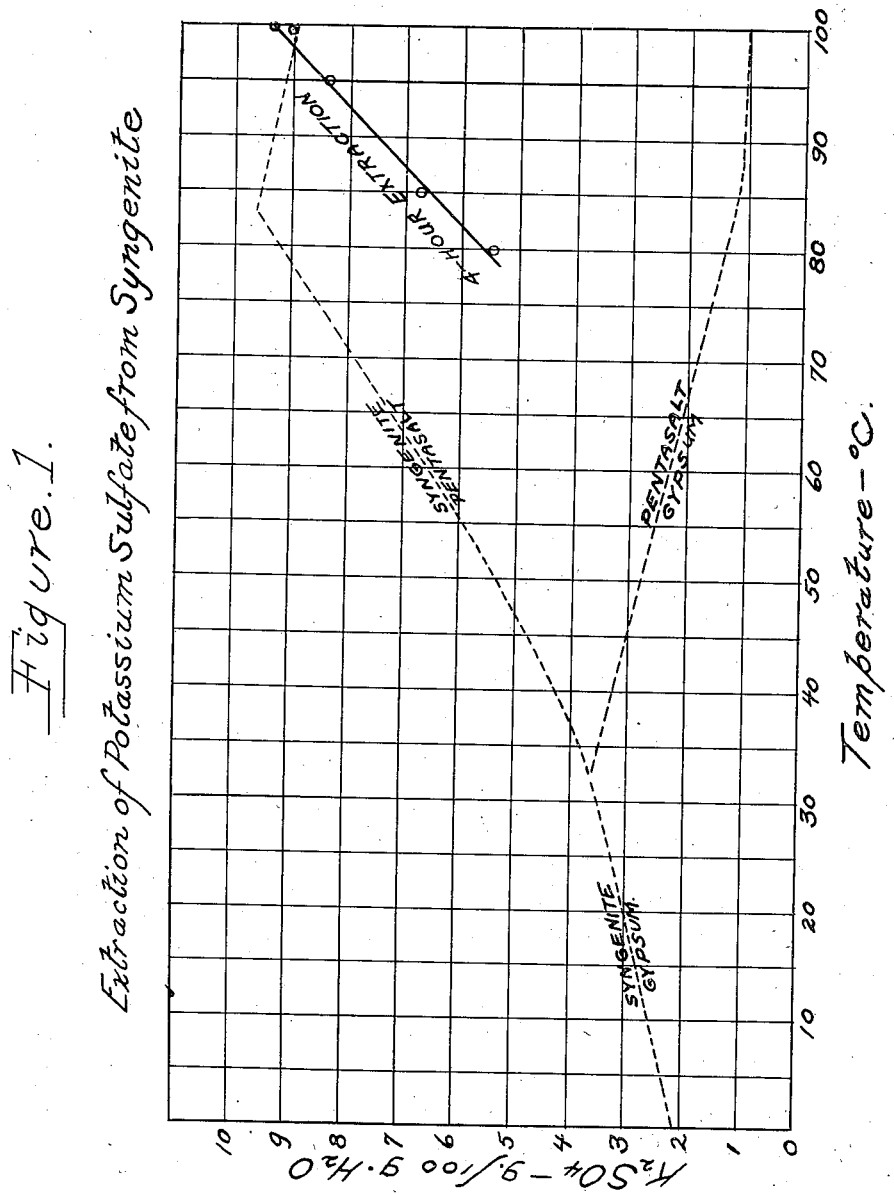
Fig. 1 represents a curve illustrating the extraction of potassium sulphate from syngenite.
Figure 2:
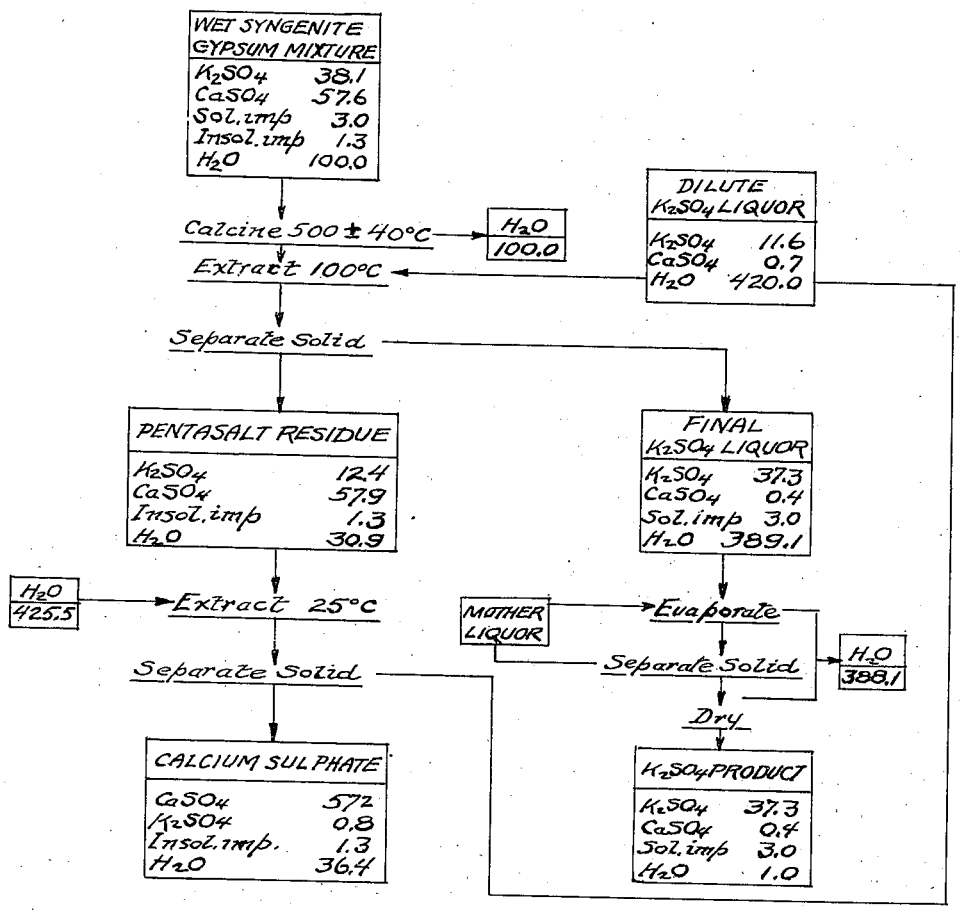
Fig. 2 is a flow sheet illustrating the method for the recovery of potassium sulphate from a wet mixture of syngenite and gypsum.
Figure 3:
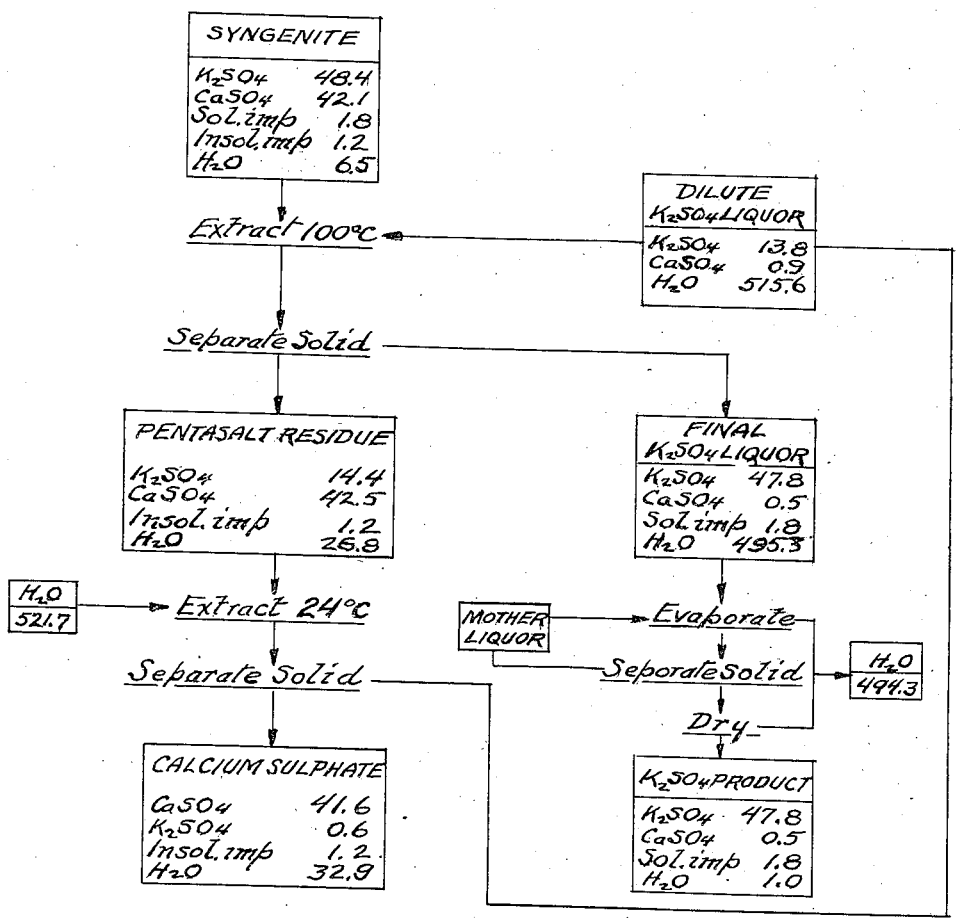
Fig. 3 is a flow sheet illustrating the method for the recovery of potassium sulphate from syngenite.

The foregoing discoveries are particularly important since they are at variance with the results which would be anticipated from the combined equilibrium data of van't Hoff ("Untersuchungen über die Bildungsverhältnisse der ozeanischen Salzablagerungen," Akademische Verlagsgesellschaft, Leipzig (1912), p. 289–93); D'Ans and Schreiner (Z. anorg. Chem. 62, 137–9 (1909)); and Anderson and Nestell (Ind. Eng. Chem. 12, 243–6 (1920)) which are represented by the broken lines in Figure 1 attached. According to the indicated course of the syngenite-pentasalt equilibrium, it would be anticipated that extraction of syngenite at 100° C. would yield a lower $K_2SO_4$ concentration than extraction at 83° C. or at some temperature intermediate between 83° and 100°. We have found by actual extraction tests at different temperatures but under otherwise comparable conditions that the liquor concentration attained at 100° C. is actually higher even than the supposed equilibrium at 100° C. between syngenite and pentasalt. The concentrations of the liquors from a series of these extraction tests made for a period of 4 hours are represented by the circles and solid line in Figure 1.

Since the extraction of syngenite by means of water at the boiling point produces a solid residue containing at least 20 per cent of the $K_2SO_4$ originally present in the syngenite, it is desirable to recover as much as possible of this potassium sulphate, which is present largely as pentasalt. We have found that by moderate agitation of pentasalt with water at an ordinary atmospheric temperature of approximately 25° C., practically complete decomposition may be obtained within a period of 18 hours to yield a dilute $K_2SO_4$ liquor containing from 2.5 to 3 parts of $K_2SO_4$ per 100 parts of water.

The steps of syngenite decomposition at approximately 100° C. to form pentasalt, and of pentasalt decomposition at approximately 25° C. to form gypsum may be combined into a two-stage process for the recovery of potassium sulphate from syngenite or from a mixture of syngenite and gypsum calcined to convert the gypsum into a relatively inactive form of calcium sulphate. In the top stage of this process the syngenite entering the system is decomposed at a temperature close to the atmospheric boiling point, by moderate agitation with a dilute $K_2SO_4$ liquor obtained from the bottom stage. It is desirable to obtain a conversion of 90 per cent or more of the syngenite to pentasalt in the top stage by proper relation of the quantities of materials and time of extraction. At the end of the top-stage extraction, the solid residue of pentasalt together with any undecomposed syngenite and any calcium sulphate originally entering in a non-reactive form is separated from the top liquor. The wet solids which may contain 30 per cent $H_2O$ on a wet basis are then repulped with the necessary amount of water and are mildly agitated in the bottom stage of the process for a relatively long period of time. Practically complete decomposition of the pentasalt and residual syngenite is effected with the simultaneous production of a dilute $K_2SO_4$ liquor which is separated from the final residue of calcium sulphate and is introduced in the top stage of the process for the decomposition of an additional quantity of syngenite.

Typical material balances for the treatment of syngenite and of a mixture of syngenite and gypsum calcined to render the latter inactive are shown in the following examples. The compositions given for the initial syngenite and calcined syngenite-gypsum are those of materials obtained by the treatment of polyhalite which as a result contain anhydrite, other insoluble impurities, and small amounts of soluble impurities such as $MgSO_4$ and $NaCl$ from retained process liquors.

Example 1

Recovery of potassium sulphate from syngenite derived from polyhalite

| Stage | | Parts by weight | | | | |
|---|---|---|---|---|---|---|
| | | $K_2SO_4$ | $CaSO_4$ | Soluble impurities | Insoluble impurities | $H_2O$ |
| Top 100° C. 6 hours | In<br>Syngenite<br>Pentasalt extract liquor from bottom stage.<br>Out<br>Pentasalt residue (30% $H_2O$, wet basis).<br>Top liquor | 48.4<br>13.8<br><br>14.4<br>47.8 | 42.1<br>0.9<br><br>42.5<br>0.5 | 1.8<br><br><br><br>1.8 | 1.2<br><br><br>1.2<br> | 6.5<br>515.6<br><br>26.8<br>495.3 |
| Bottom 25° C. 18 hours | In<br>Pentasalt residue (30% $H_2O$, wet basis).<br>Water<br>Out<br>Calcium sulphate residue (30% $H_2O$, wet basis).<br>Pentasalt extract liquor | 14.4<br><br><br>0.6<br>13.8 | 42.5<br><br><br>41.6<br>0.9 | <br><br><br><br> | 1.2<br><br><br>1.2<br> | 26.8<br>521.7<br><br>32.9<br>515.6 |

Example 2

Recovery of potassium sulphate from calcined syngenite-gypsum mixture derived from polyhalite

| Stage | | Parts by weight | | | | |
|---|---|---|---|---|---|---|
| | | $K_2SO_4$ | $CaSO_4$ | Soluble impurities | Insoluble impurities | $H_2O$ |
| Top 100° C. 6 hours | In<br>Syngenite-gypsum mixture (calcined)<br>Pentasalt extract liquor from bottom stage.<br>Out<br>Pentasalt residue (30% $H_2O$, wet basis).<br>Top liquor | 38.1<br>11.6<br><br>12.4<br>37.3 | 57.6<br>0.7<br><br>57.9<br>0.4 | 3.0<br><br><br><br>3.0 | 1.3<br><br><br>1.3<br> | <br>420.0<br><br>30.9<br>389.1 |
| Bottom 25° C. 18 hours | In<br>Pentasalt residue (30% $H_2O$, wet basis).<br>Water<br>Out<br>Calcium sulphate residue (30% $H_2O$, wet basis).<br>Pentasalt extract liquor | 12.4<br><br><br>0.8<br>11.6 | 57.9<br><br><br>57.2<br>0.7 | <br><br><br><br> | 1.3<br><br><br>1.3<br> | 30.9<br>425.5<br><br>36.4<br>420.0 |

The relatively strong $K_2SO_4$ liquor retained in the wet solid derived from the top stage may be more or less completely displaced and returned to the top stage by washing with the dilute $K_2SO_4$ liquor obtained from the bottom stage, if this is desired in order to reduce the total amount of $K_2SO_4$ carried down into the bottom stage. Similarly, the dilute $K_2SO_4$ liquor retained in the wet calcium sulphate residue derived from the bottom stage may be more or less completely displaced and returned to the bottom stage by washing with the water entering the bottom stage. Modifications of this sort would be expected by one skilled in the art and must not be confused with the essential features of the process.

It is obvious that in practice the composition of the entering solids will be subject to some variation and that more or less than 30 per cent moisture on the wet basis may be retained in the wet solids separated in the two stages. The two-stage process is sufficiently flexible to allow such variations within limits which may be maintained in practice. The examples given must therefore be regarded as illustrative and moderate changes in the relative quantities of materials and times of extraction are allowable without any essential change in the process.

We have shown that syngenite may be decomposed more advantageously at temperatures approaching the atmospheric boiling point than at lower temperatures. We have furthermore demonstrated that this decomposition may be effected within a time suitable for industrial operation to produce a $K_2SO_4$ liquor of sufficiently high concentration to make the recovery of solid potassium sulphate practicable. In addition, we have shown that the pentasalt produced by the decomposition of syngenite may in turn be decomposed within a reasonable period of time to yield practically all of its $K_2SO_4$ content in the form of a dilute liquor. Finally, we have shown that the practically complete recovery of $K_2SO_4$ from syngenite or from a mixture of syngenite and gypsum calcined to render the latter inactive may be effected by combining the decomposition of syngenite and of the pentasalt derived from it into a two-stage process yielding a $K_2SO_4$ liquor and solid calcium sulphate as its final products.

Having described our invention, what we claim as new and wish to secure by Letters Patent is:

1. A process for the recovery of potassium sulphate from syngenite which comprises decomposing syngenite by means of a hot dilute $K_2SO_4$ liquor, obtained elsewhere in the process from the decomposition of pentasalt, to produce a more concentrated $K_2SO_4$ liquor and intermediate solid material, the $K_2SO_4$ content of which is largely combined as pentasalt; separating the more concentrated $K_2SO_4$ liquor from this intermediate material and recovering solid potassium sulphate from the liquor by known means; decomposing the potassium salts in the intermediate solid material by means of water at an ordinary temperature of approximately 25° C. to yield a dilute $K_2SO_4$ liquor and a final residue of calcium sulphate; and separating this final residue by known means from the dilute $K_2SO_4$ liquor which is utilized elsewhere in the process for the decomposition of syngenite.

2. A process for the recovery of potassium sulphate from syngenite which comprises decomposing syngenite at or near the atmospheric boiling point by means of a dilute $K_2SO_4$ liquor, obtained elsewhere in the process from the decomposition of pentasalt, to produce a more concentrated $K_2SO_4$ liquor and solid material, the $K_2SO_4$ content of which is largely combined as pentasalt; separating the more concentrated $K_2SO_4$ liquor from this intermediate material and recovering solid potassium sulphate from the liquor by known means; decomposing the potassium salts in the intermediate solid material by means of water at an ordinary temperature of approximately 25° C. to yield a dilute $K_2SO_4$ liquor and a final residue of calcium sulphate; and separating this final residue by known means from the dilute $K_2SO_4$ liquor, which is utilized elsewhere in the process for the decomposition of syngenite.

3. A process for the recovery of potassium sulphate from material containing potassium sulphate and reactive calcium sulphate which comprises calcining the material at a temperature and for a time sufficient to convert the calcium sulphate into a form which reacts only at a slow rate with hot $K_2SO_4$ process liquors to form pentasalt; extracting potassium sulphate from the calcined material at or near the atmospheric boiling point by means of a dilute $K_2SO_4$ liquor obtained elsewhere in the process from the decomposition of pentasalt to produce a more concentrated $K_2SO_4$ liquor and intermediate solid material, the $K_2SO_4$ content of which is combined largely as pentasalt; separating the more concentrated $K_2SO_4$ liquor from this intermediate material and recovering solid potassium sulphate from the liquor by known means; decomposing the potassium salts in the intermediate solid material by means of water at an ordinary temperature of approximately 25° C. to yield a dilute $K_2SO_4$ liquor and a final residue of calcium sulphate; and separating this final residue by known means from the dilute $K_2SO_4$ liquor which is utilized elsewhere in the process for the extraction of the calcined material.

4. A process for the recovery of potassium sulphate from material containing syngenite and reactive calcium sulphate which comprises calcining the material at a temperature and for a time sufficient to convert the calcium sulphate into a form which reacts only at a slow rate with hot $K_2SO_4$ process liquors to form pentasalt; extracting potassium sulphate from the calcined material at or near the atmospheric boiling point by means of a dilute $K_2SO_4$ liquor obtained elsewhere in the process from the decomposition of pentasalt to produce a more concentrated $K_2SO_4$ liquor and intermediate solid material, the $K_2SO_4$ content of which is combined largely as pentasalt; separating the more concentrated $K_2SO_4$ liquor from this intermediate material and recovering solid potassium sulphate from the liquor by known means; decomposing the potassium salts in the intermediate solid material by means of water at an ordinary temperature of approximately 25° C. to yield a dilute $K_2SO_4$ liquor and a final residue of calcium sulphate; and separating this final residue by known means from the dilute $K_2SO_4$ liquor which is utilized elsewhere in the process for the extraction of the calcined material.

5. A process for the recovery of potassium sulphate from material containing syngenite and gypsum which comprises calcining the material at a temperature and for a time sufficient to convert the gypsum into a form which reacts only at a slow rate with hot $K_2SO_4$ process liquors to form pentasalt; extracting potassium sulphate from the calcined material at or near the atmospheric boiling point by means of a dilute $K_2SO_4$ liquor obtained elsewhere in the process from the decomposition of pentasalt to produce a more concentrated $K_2SO_4$ liquor and intermediate solid material, the $K_2SO_4$ content of which is combined largely as pentasalt; separating the more concentrated $K_2SO_4$ liquor from this intermediate material and recovering solid potassium sulphate from the liquor by known means; decomposing the potassium salts in the intermediate solid material by means of hot water at an ordinary temperature of approximately 25° C. to yield a dilute $K_2SO_4$ liquor and a final residue of calcium sulphate; and separating this final residue by known means from the dilute $K_2SO_4$ liquor which is utilized elsewhere in the process for the extraction of the calcined material.

6. In a process for the recovery of potassium sulphate from syngenite, the step of decomposing the syngenite at or near the atmospheric boiling point by means of a dilute $K_2SO_4$ liquor to yield a more concentrated liquor containing 9 or more parts of $K_2SO_4$ per 100 parts of $H_2O$ and a solid residue, the $K_2SO_4$ content of which is largely combined as pentasalt.

7. In a process for the recovery of potassium sulphate from syngenite, the step of decomposing the syngenite at or near the atmospheric boiling point by means of water to produce a $K_2SO_4$ liquor containing 9 or more parts of $K_2SO_4$ per 100 parts of $H_2O$ and a solid material, the $K_2SO_4$ content of which is largely combined as pentasalt.

8. In a process for the recovery of potassium sulphate from a material containing potassium sulphate and calcium sulphate, the step of calcining the material at a temperature and for a time sufficient to convert the calcium sulphate into a form which during subsequent extraction of the calcined material at or near the atmospheric boiling point reacts only at a slow rate with the hot $K_2SO_4$ process liquors to form pentasalt.

9. In a process for the recovery of potassium sulphate from a material containing syngenite and gypsum, the step of calcining the mixture at a temperature and for a time sufficient to convert the gypsum into a form which during subsequent extraction of the calcined material at or near the atmospheric boiling point reacts only at a slow rate with the hot $K_2SO_4$ process liquors to form pentasalt.

H. H. STORCH.
NATHAN FRAGEN.